United States Patent [19]

Inaba et al.

[11] Patent Number: 4,958,912
[45] Date of Patent: Sep. 25, 1990

[54] IMAGE FORMING APPARATUS

[75] Inventors: Yutaka Inaba, Kawaguchi; Hideyuki Kawagishi, Fujisawa; Makoto Kojima, Hino; Shuzo Kaneko, Yokohama, all of Japan

[73] Assignee: Canon Kabushiki Kaisha, Japan

[21] Appl. No.: 215,791

[22] Filed: Jul. 6, 1988

[30] Foreign Application Priority Data

Jul. 7, 1987 [JP] Japan .................. 62-167835
Jul. 31, 1987 [JP] Japan .................. 62-191864

[51] Int. Cl.⁵ .................. G02F 1/13; G09G 3/00
[52] U.S. Cl. .................. 350/333; 350/350 S; 340/805
[58] Field of Search .................. 350/332, 333, 350 S; 340/805, 811; 355/234

[56] References Cited

U.S. PATENT DOCUMENTS

| | | | |
|---|---|---|---|
| 4,548,476 | 10/1985 | Kaneko | 350/333 |
| 4,591,849 | 5/1986 | Hughes et al. | 350/332 |
| 4,591,886 | 5/1986 | Umeda et al. | 350/350 S |
| 4,593,978 | 6/1986 | Mourey et al. | 350/350 S |
| 4,605,972 | 8/1986 | Hatanaka | 350/332 |
| 4,769,659 | 9/1988 | Umeda et al. | 350/380 S |
| 4,838,652 | 6/1989 | Inaba et al. | 350/332 X |

FOREIGN PATENT DOCUMENTS

| | | |
|---|---|---|
| 0131873 | 1/1985 | European Pat. Off. |
| 3630012 | 4/1987 | Fed. Rep. of Germany |
| 2183054 | 5/1987 | United Kingdom |

OTHER PUBLICATIONS

Applied Physics Letters, vol. 36, No. 11, pp. 899–901, Clark, N., et al., Submicrosecond Bistable Electro-Optic Switching in Liquid Crystals.

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

An image forming apparatus includes a light source; an optical shutter unit comprising a pair of parallel substrates respectively having a plurality of scanning electrodes and a plurality of data electrodes disposed to intersect with each other to form a matrix electrode structure on their opposite surfaces, and a ferroelectric liquid crystal disposed between the pair of substrates so as to form a microshutter at each intersection of the scanning electrodes and data electrodes; an optical system for forming an image at a desired position with light transmitted through the optical shutter unit; a photosensitive member as a medium for recording the thus formed image; a scanning side drive circuit for applying a scanning voltage signal to the plurality of scanning electrodes so as to sequentially select at least one scanning electrode in a prescribed cycle; and a data side drive unit for applying data voltage signals to the plurality of data electrodes in synchronism with said scanning voltage signal. Image data are transferred on the optical shutter unit corresponding to the movement of the photosensitive member so as to move an image formed thereby on the photosensitive member while keeping the relative position of the image with respect to the photosensitive member.

16 Claims, 8 Drawing Sheets

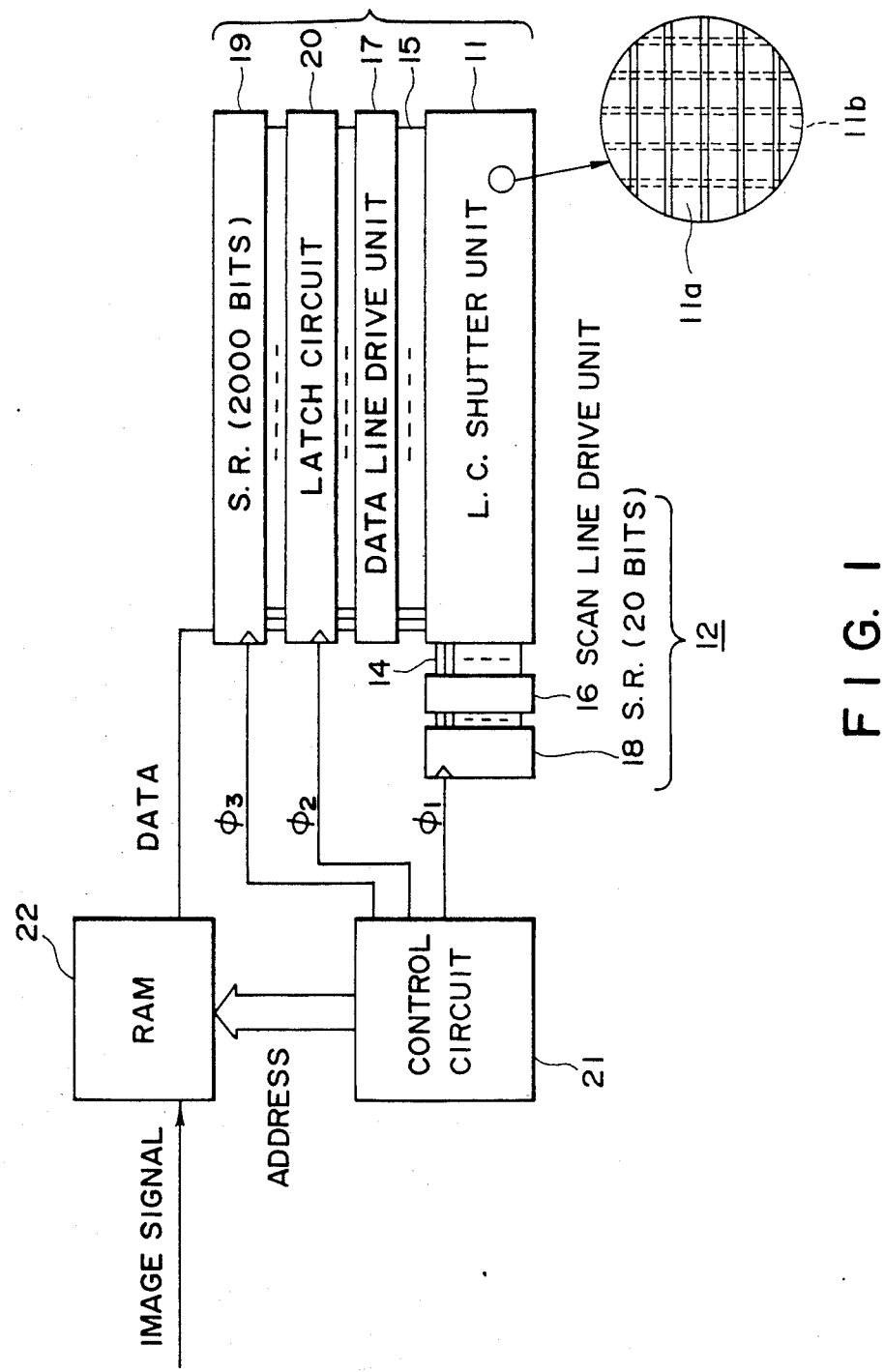
F I G. 1

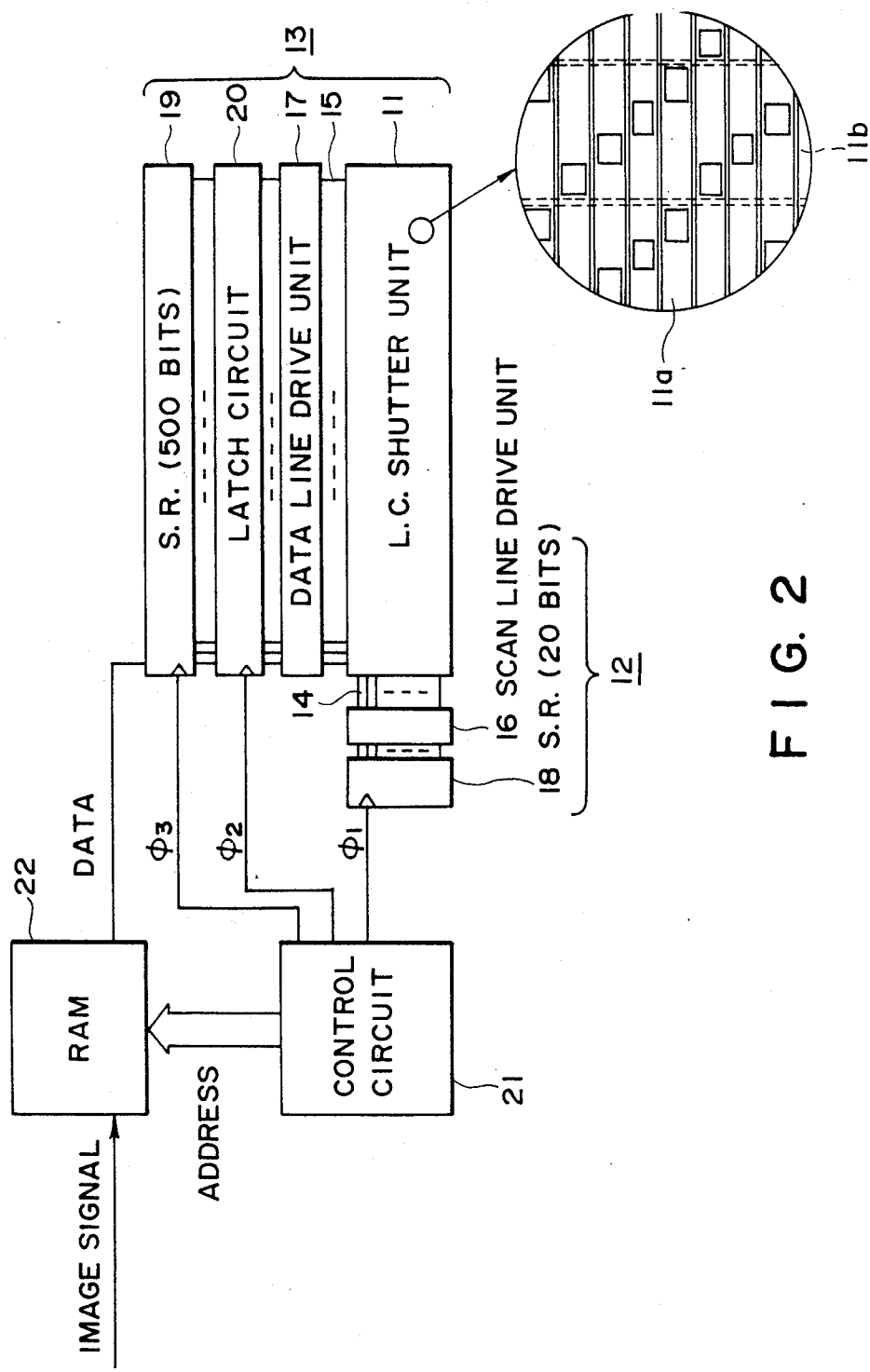
F I G. 2

DIRECTION OF MOVEMENT

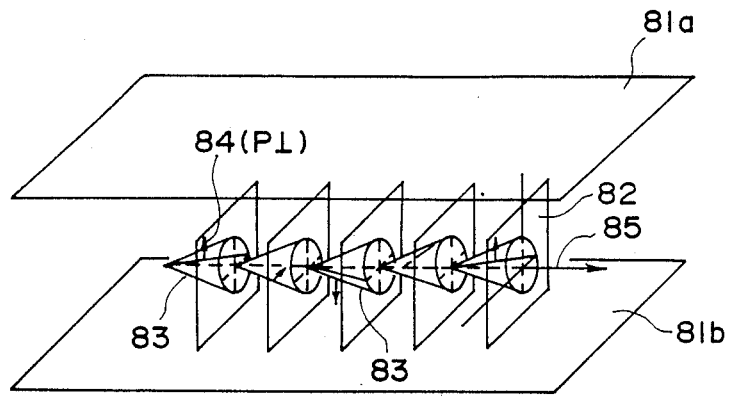
F I G. 8
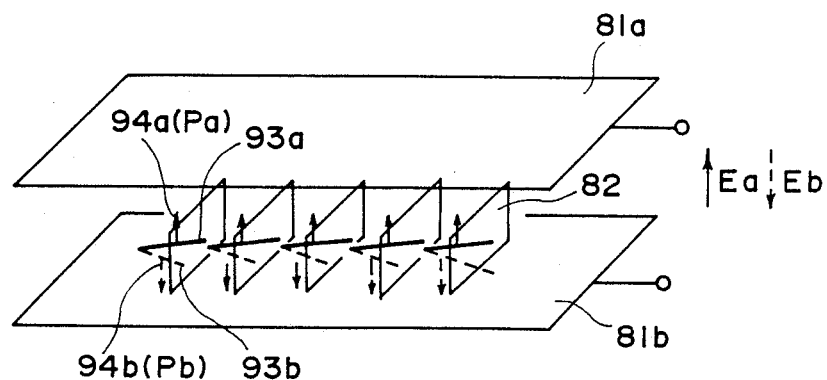
F I G. 9

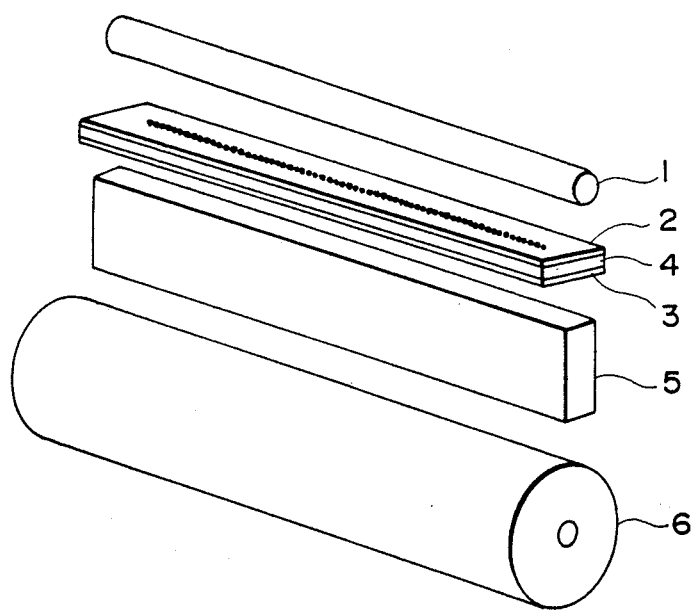
F I G. 10

IMAGE FORMING APPARATUS

FIELD OF THE INVENTION AND RELATED ART

The present invention relates to an image forming apparatus, particularly an image forming apparatus provided with a liquid crystal-optical shutter array using a ferroelectric liquid crystal.

Hitherto, there have been several proposals on a so-called "liquid crystal-optical shutter array" wherein the electro-optical modulation function of a liquid crystal (hereinafter sometimes abbreviated as "LC") is utilized, and light is irradiated to LC-modulation cells as microshutters arranged in the form of an array, so that selectively transmitted light is provided to a photosensitive member as light image signals. Such LC-optical shutter arrays are disclosed in, e.g., Japanese Laid-Open Patent Application Nos. (JP-A) Sho56-98073, 56-98967 and 57-120466.

Further, LC-optical shutter arrays utilizing the high speed responsiveness and memory characteristic of a ferroelectric liquid crystal have been disclosed in, e.g., U.S. Pat. No. 4,548,476 and JP-A No. Sho60-107023.

FIG. 10 shows a schematic arrangement of an example of an image forming apparatus using an LC-optical shutter array. Referring to the figure, the image forming apparatus is roughly composed of a linear light source 1 such as a fluorescent lamp, a pair of polarizers 2 and 3, an LC-optical shutter panel 4 comprising an LC-microshutter array interposed between the polarizers 2 and 3, a lens array 5, and a photosensitive drum 6. Accessories such as a charger are omitted from showing. Light emitted from the source 1 passes through a modulation system comprising the polarizers 2 and 3 and the shutter panel 4, collected by the lens array 5, and then irradiated onto the photosensitive drum 6. An electrostatic recording apparatus like this has several advantages such as the ease of realizing a small apparatus and absence of mechanically moving parts to provide less noise.

In image forming apparatuses of the electrostatic recording system using such an LC-optical shutter array, however, as light emitted from a light source is generally passed through polarizers, a liquid crystal cell and lenses to reach a photosensitive member, a considerable portion of the initial light leaks or is attenuated. Consequently the light reaching the photosensitive member can be weak resulting in the production of inferior quality images. In order to obviate this defect, a high luminescence light source or a photosensitive member with a high sensitivity is required, so that there arises another problem of high production cost.

As another problem, it is difficult to obtain a half-tone image by an LC-optical shutter array. Particularly, in the case of an LC-optical shutter array using a ferroelectric liquid crystal (sometimes abbreviated as "FLC"), it is difficult to form an intermediate optical transmission state because the FLC assumes either one of two optically stable states, as shown in U.S. Pat. No. 4,367,924.

SUMMARY OF THE INVENTION

An object of the present invention is to solve the above mentioned problems and provide an image forming apparatus of a good image quality using a liquid crystal-optical shutter at a low production cost without requiring a high luminescent light source or a high sensitivity photosensitive member.

Another object of the present invention is to provide an image forming apparatus suitable for preparing a half-tone image.

According to the present invention, there is provided an image forming apparatus, comprising: a light source; an optical shutter unit comprising a pair of parallel substrates respectively having a plurality of scanning electrodes and a plurality of data electrodes disposed to intersect with each other to form a matrix electrode structure on their opposite surfaces, and a ferroelectric liquid crystal disposed between the pair of substrates so as to form a microshutter at each intersection of the scanning electrodes and data electrodes; an optical system for forming an image at a desired position with light transmitted through the optical shutter unit; a photosensitive member as a medium for recording the thus formed image; a scanning side drive circuit for applying a scanning voltage signal to the plurality of scanning electrodes so as to sequentially select at least one scanning electrode in a prescribed cycle; and a data side drive unit for applying data voltage signals to the plurality of data electrodes in synchronism with said scanning voltage signal, so that image data are transferred on the optical shutter unit corresponding to the movement of the photosensitive member so as to move an image formed thereby on the photosensitive member while keeping the relative position of the image with respect to the photosensitive member.

According to another aspect of the present invention, there is provided an image forming apparatus, comprising: a light source; an optical shutter unit comprising liquid crystal-microshutters arranged in a plurality of rows and in a plurality of columns, each microshutter being capable of controlling the transmittance therethrough of light from the light source depending on given gradation data; an optical system for forming an image at a desired position with light transmitted through the optical shutter unit; and a photosensitive member as a medium for recording the thus formed image disposed in such a manner that a particular position on the photosensitive member is exposed to light a plurality of times respectively through a plurality of microshutters each belonging to one of the plurality of rows; the opening period of a microshutter being different for the respective rows of the microshutters.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic diagrams each showing an LC-optical shutter unit and its peripheral circuit according to an embodiment of the present invention;

FIGS. 8 and 9 are schematic perspective views for explanation of the operation principle of a ferroelectric liquid crystal device used in the present invention; and FIG. 10 is a schematic arrangement view illustrating an example of an image forming apparatus.

DESCRIPTION OF THE PREFERRED EMBODIMENTS

Figure 3:
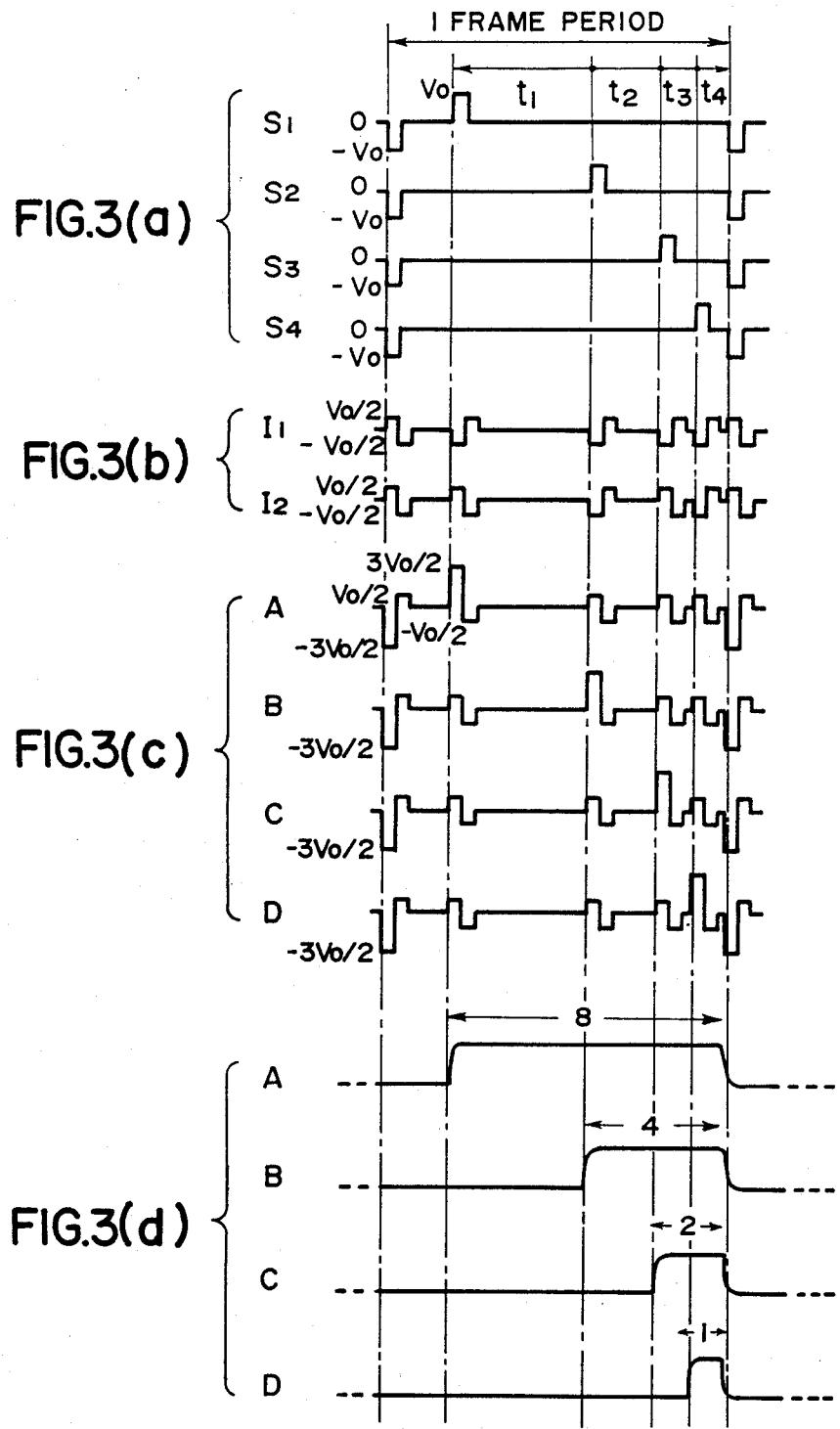
FIGS. 3(a)–3(d) and 6 are time charts showing a set of driving waveforms and optical responses used in the present invention expressed in time series.

FIG. 1 is a diagram showing an LC-optical shutter unit and its peripheral circuit according to an embodiment of the image forming apparatus of the present invention.

Referring to FIG. 1, an LC-optical shutter unit 11 comprises a pair of substrates (not shown) having 20 scanning electrodes 11a and 2000 data electrodes 11b, respectively, facing each other on their opposite faces so as to form a matrix electrode, and a ferroelectric liquid crystal (FLC, not shown) disposed between the substrates. In this embodiment, the intersections of the scanning electrodes 11a and the data electrodes 11b each constitute a microshutter or shutter window and are arranged in the form of a matrix as shown by a schematically enlarged view at the lower right corner in FIG. 1.

The 20 scanning electrodes 11a of the LC-optical shutter unit 11 are connected via scanning lines 14 to a scanning side drive circuit 12 including a 20-bit shift register 18 and a scanning line drive unit 16 which successively supplies a scanning voltage based on scanning signals from the shift register. On the other hand, the 2000 data electrodes 11b are connected via data lines 15 to a data side drive circuit 13 including a 2000-bit shift register 19 for storing image data from an external circuit in parallel at specified points of time, a latch circuit 20 for once memorizing image signals from the shift register 19, and a data line drive unit 17 for supplying data voltages according to the data signals from the shift register 19.

The system shown in FIG. 1 further includes a control circuit 21 for supplying control pulses $\phi_1$, $\phi_2$ and $\phi_3$ to the shift registers 18, 19 and the latch circuit 20, respectively, and a RAM (random access memory) 22. The other members of the image forming apparatus are similar to those shown in FIG. 10. Thus, a fluorescent light source is disposed as a linear light source above the LC-optical shutter unit, and below the unit are disposed an optical system and a photosensitive drum.

In the above-described system, when a control pulse $\phi_1$ is supplied to the shift register 18 from the control circuit 21, the shift register 18 supplies a scanning signal to the scanning line drive unit 16. In response to the scanning signal, the scanning line drive unit 16 supplies a scanning voltage whereby a scanning line 14 is selected or not selected. On the other hand, image signals supplied to the RAM 22 are stored therein in an amount required for 20×2000 pixels, and new image signals for one line (2000 bits) are supplied from the exterior and the oldest image signals for one line are discarded therefrom for each field scanning operation. Image data sent from the RAM 22 are converted by the shift register 19 into parallel signals for one line, which are then sent to the latch circuit 20 by a control pulse $\phi_3$. The data signals stored in the latch circuit 20 are sent to the data line drive unit 17 by a control pulse $\phi_2$ at completion of each line. By the data line drive unit 17, data voltages are applied corresponding to the data signals whereby the data lines 15 are respectively selected or not selected. The application of the data voltages is synchronized with the application of the scanning voltages as the scanning lines are described above, whereby an image pattern is formed on the shutter unit (array) 11.

The control circuit 21 generates the control pulses $\phi_1-\phi_3$, and in synchronism therewith, supplies a readout address signal to the RAM 22, wherein the address signal is supplied so that an addressed row is shifted by one row for each one field scanning. After the 20 scanning lines are scanned once in this manner, an image pattern is formed on the shutter unit, and in the subsequent scanning, an image pattern is formed by shifting one bit in the direction of a data line. If the above-operation is repeated thereafter, an image pattern on the shutter unit is moved, as if it flows in the direction of the data lines, to effect so-called "scrolling". At this time, an image formed on the photosensitive member moves at an equal speed in the reuse direction as the optical system provides an inverted image of an equal size. Therefore, if the photosensitive member is rotated corresponding to the above movement, a light image is caused to illuminate the same part of the photosensitive member without changing a relative position with respect to the photosensitive member. As a result, the exposure quantity (illuminance X time) is increased to twenty times that given by a conventional single-row shutter array if it is assumed that the exposure illuminance during the movement is constant. In an actual case using an optical system, however, the light transmitted through the LC-optical shutter unit 11 reaches the photosensitive drum at different percentages depending on the position of an image in question. As a result, in the particular actual embodiment as described above, the total exposure quantity was about 12 times that obtained by a single-row shutter array. It was further observed that undesirable phenomena such as after image and tailing occurred along with the movement of an image on the LC-optical shutter unit 11 when a TN-type device was used in the shutter unit, whereas a clear image having a high contrast and free of after image or tailing was obtained when a ferroelectric liquid crystal device was used.

FIG. 2 illustrates another embodiment of the present invention which is similar to the one shown FIG. 1 except that microshutters formed at intersections of 20 scanning lines and 500 data lines are arranged in a staggered fashion as shown at the lower right corner in FIG. 2. In FIG. 2, the same reference numerals as used in FIG. 1 denote equivalent parts. In the previous embodiment, a point on the photosensitive member is repeatedly exposed 20 times during the movement, whereas it is exposed 5 times in this embodiment. Accordingly, it is necessary to reduce the image movement or transfer velocity and the peripheral speed of the photosensitive member to about ¼ times those in the previous embodiment in order to obtain the same exposure quantity. In this embodiment, however, the number of data lines is reduced to ¼ so that the data line drive unit is simplified to result a remarkable reduction in apparatus cost.

In the above embodiments, image data on the shutter unit are moved by one line for one-frame scanning. It is however possible to adopt a scheme wherein image data are moved by one line for scanning of two or more frames or a scheme wherein image data are moved by two or more lines for one-frame scanning (interlaced scanning). In any scheme, image data formed on a photosensitive member are moved or transferred accompanying the movement of a photosensitive member without changing the relative position.

Image data formed on one line of shutters arranged in a matrix are transferred line by line so that the image formed on the photosensitive member does not change its relative position with respect to the photosensitive member. As the transfer operation is repeated, an image pattern on the shutter unit is moved as if it flows in the direction of the data lines to effect so-called "scrolling". As a result, a particular point of the photosensitive member is continually exposed to the same bit of light image, so that even a low-luminance light source or a low-sensitivity photosensitive member can provide an image of a sufficiently high quality.

As an ordinary TN-type liquid crystal has a slow response time on the order of 100 msec, the response of the liquid crystal at the time of scrolling cannot follow the change in applied voltage to cause a phenomenon of after image or tailing so that it is difficult to effect normal transfer of image data. However, it is possible to effect scrolling without such after image or tailing by using a ferroelectric liquid crystal showing a response time on the order of 100 $\mu$sec.

As described above, according to the image forming apparatus of the present invention, shutter windows or microshutters of an LC-optical shutter unit are arranged in the form of a matrix using preferably a ferroelectric liquid crystal, and image data on the shutter unit are moved or transferred along the movement of a photosensitive drum so that the resultant image formed on the photosensitive member does not change its relative position with respect to the photosensitive member, whereby an image of a sufficiently high quality can be obtained even by using a light source of low luminance or a photosensitive member of a low sensitivity. Particularly, by using a ferroelectric liquid crystal device in the LC-optical shutter unit, a clear and high-contrast image can be formed on the photosensitive drum, the image quality is further improved. Further, if a staggered arrangement of unit shutters is adopted, the drive circuit can be simplified to reduce a production cost.

Figure 4:
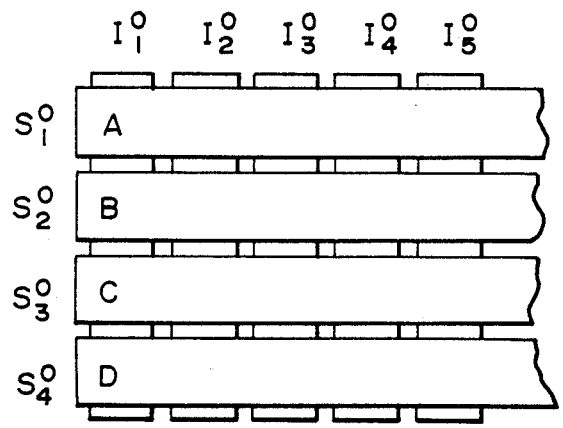
FIG. 4 is a schematic partial plan view of a matrix electrode structure used in the present invention.

FIGS. 3(a)-3(d) are time charts showing a set of driving waveforms used in the present invention and optical responses obtained as a result respectively expressed in time series, and FIG. 4 is a schematic partial plan view of a matrix electrode structure used in an apparatus of the present invention.

The matrix electrode structure shown in FIG. 4 allows a gradational display with 16 steps of 0/15, 1/15, ... 15/15 by 4 shutter rows. The scanning lines $S_1^0$, $S_2^0$, $S_3^0$ and $S_4^0$ are supplied with scanning signals $S_1$, $S_2$, $S_3$ and $S_4$, respectively, shown at FIG. 3(a), and the data lines $I_1^0$, $I_2^0$, ... are supplied with image signals $I_1$, $I_2$, ... in the form of binary signals of open and close in 4 times as shown at FIG. 3(b).

Figure 5:
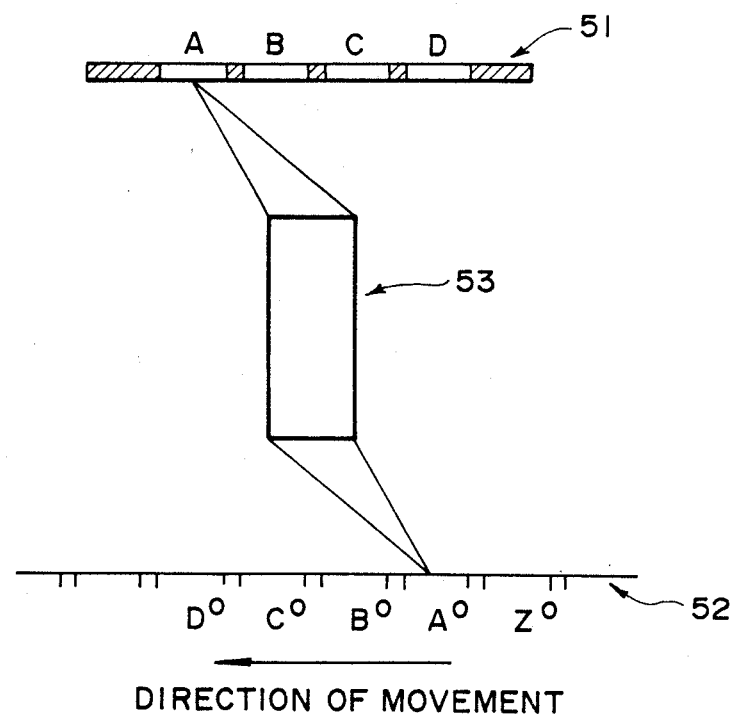
FIG. 5 is a schematic view illustrating a positional relationship between a shutter unit and a photosensitive member.

At this time, 4 pixels A, B, C and D on a particular data line ($I_1^0$ in FIG. 4 in this embodiment) are supplied with voltages in time-serial waveforms shown at FIG. 3(c) A, B, C and D, whereby the pixels are provided with light transmission states as shown at FIG. 3(d) A, B, C and D, respectively, as the open or closed state of a pixel is determined depending on the electric field direction of a voltage applied to the pixel exceeding the threshold voltage of the ferroelectric liquid crystal. In this embodiment, the voltage value $V_0$ is set to satisfied the relationship of $|V_0|<|Vth|<|3V_0/2|$, wherein Vth denotes the threshold value of the ferroelctric liquid crystal. As a result, referring to FIG. 5 which shows a positional relationship between a shutter array 51 and a photosensitive member 52 in an image forming apparatus, image forming positions $A^0$, $B^0$, $C^0$ and $D^0$ on the photosensitive member are exposed in this scanning cycle to quantities of light in ratios of 8:4:2:1 as the scanning lines $S_1$, $S_2$, $S_3$ and $S_4$ are supplied with scanning selection signals having durations set at ratios of 8:4:2:1 in this embodiment. Referring further to FIG. 5, light images transmitted through microshutters (pixels) A, B, C and D on the shutter array 51 are focused at the image-forming positions $A^0$, $B^0$, $C^0$ and $D^0$ on the photosensitive member 52 by the action of a lens array 53 providing an inverted image of an equal size.

Then, another image is formed on the shutter array 51 by repeating the above-mentioned scanning cycle while the photosensitive member is shifted for a distance of one time. As a result, light images through the pixels B, C and D are focused at the image-forming positions $A^0$, $B^0$ and $C^0$, respectively, and the image-forming position $D^0$ is moved out of the image forming region while an image-forming position $Z^0$ comes into a position for receiving transmitted light through the pixel A.

Figure 6:
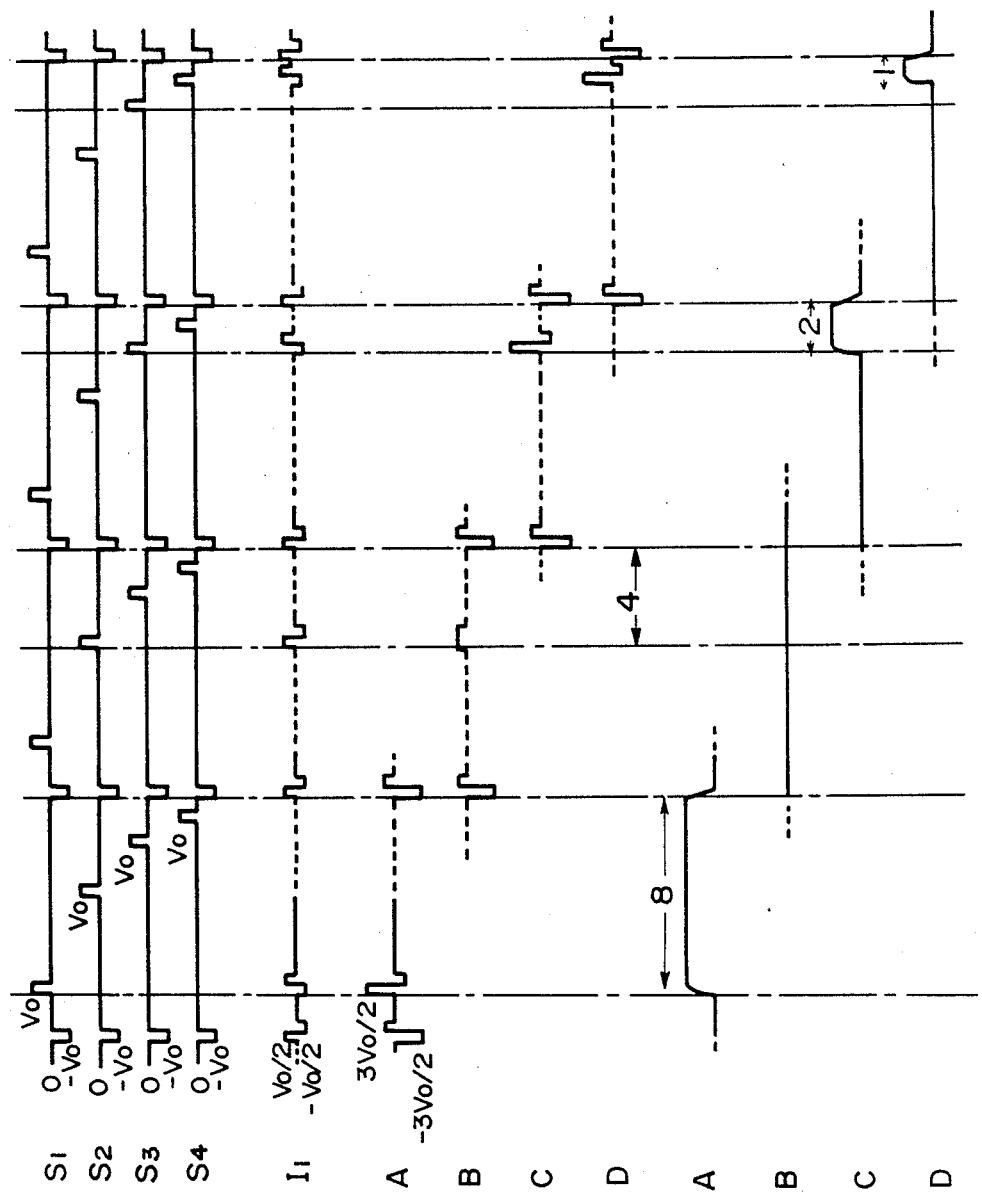

By repeating the above scanning operation, a particular point on the photosensitive member receives light transmitted successively through the pixels A, B, C and D to complete a whole exposure stage by 4 scanning cycles. In order to provide the particular point with an exposure for providing a gradation of 11/15, the pixels A, B, C and D are supplied with signals of "open", "close", "open" and "open", respectively, as 11 is given by the sum of 8+0+2+1. FIG. 6 shows a set of scanning line voltages and data line voltages to be applied in that case. The designation of "open" or "close" signal to the pixels A, B, C and D at their respective exposure time is listed in the following Table 1 corresponding to a series of required gradation.

TABLE 1

| Pixel | Gradation | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| A | 0 | 0 | 0 | 0 | 0 | 0 | 0 | 0 | 1 | 1 | 1 | 1 | 1 | 1 | 1 | 1 |
| B | 0 | 0 | 0 | 0 | 1 | 1 | 1 | 1 | 0 | 0 | 0 | 0 | 1 | 1 | 1 | 1 |
| C | 0 | 0 | 1 | 1 | 0 | 0 | 1 | 1 | 0 | 0 | 1 | 1 | 0 | 0 | 1 | 1 |
| D | 0 | 1 | 0 | 1 | 0 | 1 | 0 | 1 | 0 | 1 | 0 | 1 | 0 | 1 | 0 | 1 |

1: OPEN
0: CLOSE

In a preferred embodiment of the present invention, a driving scheme as disclosed by, e.g., U.S. Pat. No. 4,655,561 in addition to the one shown in FIGS. 3(a)-3(d) may be used.

Figure 7A:
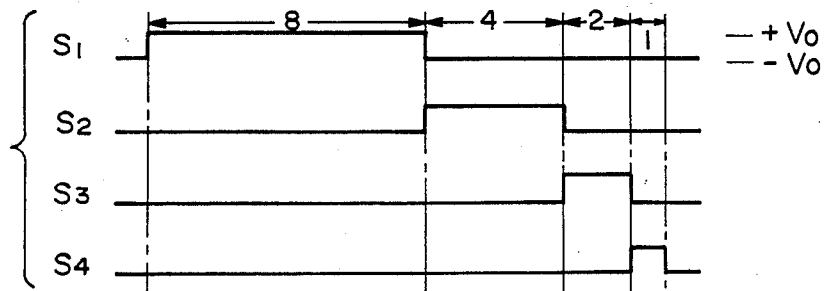
FIGS. 7(a)–7(d) are the charts showing another set of driving waveforms and optical responses used in the present invention expressed in time series.
Figure 7B:
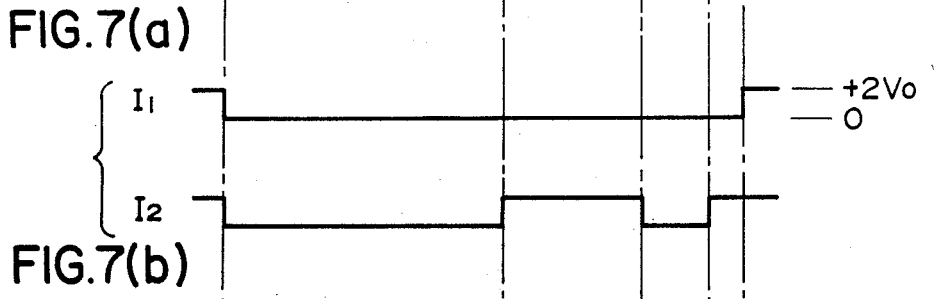
Figure 7C:
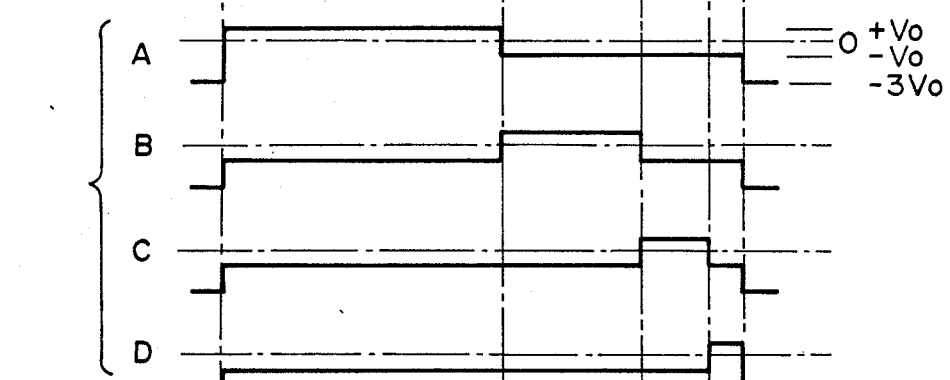
Figure 7D:
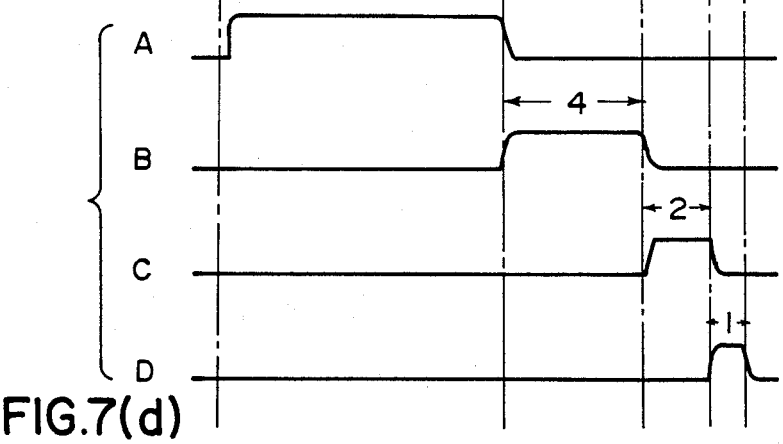

In the above embodiments, there has been utilized a property of a ferroelectric liquid crystal that it causes a transition between the orientation states only when it is supplied with a voltage exceeding a threshold and retains its state when supplied with a voltage below the threshold. In another preferred embodiment of the present invention, a ferroelectric liquid crystal pixel is always supplied with an electric field exceeding a threshold and the open or closed state of the pixel is governed by the direction of the electric field. FIGS. 7(a)–7(d) show an example set of driving waveforms used in such an embodiment. More specifically, FIG. 7 shows (a) scanning pulses $S_1$–$S_4$ applied to 4 rows of unit shutters in a matrix shutter array, (b) data pulses $I_1$ and $I_2$, (c) resultant voltages applied to pixels A, B, C and D, and (d) resultant light-transmission states at the respective pixels. This driving scheme utilizes a property that a pixel assumes "open" when supplied with a positive direction voltage and "close" when supplied with a negative direction voltage, respectively exceeding a voltage $V_0$, as described in detail in U.S. Pat. No. 4,548,476. The respective pixels show light transmission states as shown at FIG. 7(d).

As the selection periods for the respective scanning lines are set to ratios of 8:4:2:1, the pixels A, B, C and D are respectively exposed to quantities of light in ratios of 8:4:2:1. By repeating the scanning operation, a gradational image formation can be effected in the same manner as in the previous embodiment.

As the liquid crystal showing bistability used in the image forming apparatus of the present invention, a chiral smectic liquid crystal showing ferroelectricity is most preferred. Particularly, a liquid crystal in chiral smectic C phase (SmC*) or H phase (SmH*) is suited. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal"; U.S. Pat. Nos. 4,561,726, 4,589,996, 4,596,667, 4,613,209, 4,614,609, and 4,639,089, etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-O-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume an SmC* or SmH*.

Further, in the present invention, it is also possible to use a ferroelectric liquid crystal in chiral smectic F phase, I phase, J phase, G phase or K phase in addition to one in SmC* or SmH*.

Referring to FIG. 8, there is schematically shown an example of a ferroelectric liquid crystal cell for explanation of the operation thereof. Reference numerals 81a and 81b denote substrates (glass plates) on which a transparent electrode of, e.g., $In_2O_3$, $SnO_2$, ITO (Indium-Tin-Oxide), etc., is disposed, respectively. A liquid crystal of, e.g., an SmC*-phase in which liquid crystal molecular layers 82 are oriented perpendicular to surfaces of the substrates is hermetically disposed therebetween. Full lines 83 show liquid crystal molecules. Each liquid crystal molecule 83 has a dipole moment (P⊥) 84 in a direction perpendicular to the axis thereof. When a voltage higher than a certain threshold level is applied between electrodes formed on the substrates 81a and 81b, a helical structure of the liquid crystal molecule 83 is unwound or released to change the alignment direction of respective liquid crystal molecules 83 so that the dipole moments (P⊥) 84 are all directed in the direction of the electric field. The liquid crystal molecules 83 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1 $\mu$), the helical structure of the liquid crystal molecules is unwound even in the absence of an electric field whereby the dipole moment assumes either of the two states, i.e., Pa in an upper direction 93a or Pb in a lower direction 93b as shown in FIG. 9. When electric field Ea or Eb higher than a certain threshold level and different from each other in polarity as shown in FIG. 9 is applied to a cell having the above-mentioned characteristics, the dipole moment is directed either in the upper direction 94a or in the lower direction 94b depending on the vector of the electric field Ea or Eb. In correspondence with this, the liquid crystal molecules are oriented in either of a first stable state 93a (bright state) and a second stable state 93b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 9. When the electric field Ea is applied to the liquid crystal molecules, they are oriented in the first stable state 93a. This state is stably retained even if the electric field is removed. On the other hand, when the electric field Eb of which direction is opposite to that of the electric field Ea is applied thereto, the liquid crystal molecules are oriented to the second stable state 93b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$.

As described above, according to the present invention, a half tone image can be produced by a binary state-controlling drive scheme of controlling a state of open or close, so that the designing of an image forming apparatus, particularly of a drive circuit therefor, can be remarkably simplified.

What is claimed is:

1. An image forming apparatus comprising:
   a light source;
   an optical shutter unit comprising a pair of parallel substrates respectively having a plurality of scanning electrodes and a plurality of data electrodes disposed to intersect with each other to form a matrix electrode structure on opposite surfaces thereof and a ferroelectric liquid crystal disposed between said pair of substrates so as to form respective microshutters at each intersection of said scanning electrodes and said data electrodes, wherein said microshutters are arranged in a plurality of rows corresponding to said plurality of scanning electrodes;
an optical system for forming an image at a desired position with light transmitted through said optical shutter unit;
a photosensitive member;
a scanning line drive circuit for applying scanning voltage signals to said plurality of scanning electrodes so as to sequentially select at least one scanning electrode in a prescribed cycle;
a data line drive circuit for applying data voltage signals to said plurality of data electrodes in synchronism with said scanning voltage signal;
means for applying first image data to first ones of said microshutters on a first particular scanning electrode in a first scanning cycle and applying second image data associated with said first image data to provide desired gradation of the image to second ones of said microshutters on a second particular scanning electrode in a subsequent second scanning cycle;
means for controlling the scanning line drive circuit to provide different opening periods to said microshutters in respective rows; and
means for moving said photosensitive member so that a particular position on said photosensitive member corresponds to said first particular scanning electrode in the first scanning cycle, the particular position further corresponding to said second particular scanning electrode in the second scanning cycle.

2. An apparatus according to claim 1, wherein said microshutters are arranged in a staggered fashion.

3. An apparatus according to claim 1, wherein third image data are applied to third ones of said microshutters on a third particular scanning electrode in a third scanning cycle.

4. An apparatus according to claim 1, wherein said ferroelectric liquid crystal comprises a chiral smectic liquid crystal.

5. An apparatus according to claim 4, wherein said chiral smectic liquid crystal is disposed in a layer thin enough to release its own helical structure.

6. An apparatus according to claim 1, wherein said microshutters are arranged in a predetermined number N of rows and are controlled to have opening periods in ratios of $1:2:4:8: \ldots :2^{(N-1)}$ for the respective rows.

7. An apparatus according to claim 1, wherein said first and second particular scanning electrodes are disposed adjacent to each other.

8. An apparatus according to claim 1, wherein the different microshutter opening periods are given by application of scanning pulses with different durations.

9. An image forming apparatus comprising:
a light source;
an optical shutter unit comprising a pair of parallel substrates respectively having a plurality of scanning electrodes and a plurality of data electrodes disposed to intersect with each other to form a matrix electrode structure on opposite surfaces thereof and a ferroelectric liquid crystal disposed between said pair of substrates so as to form respective microshutters at each intersection of said scanning electrodes and said data electrodes;
an optical system for forming an image at a desired position with light transmitted through the optical shutter unit;
a photosensitive member;
a scanning line drive circuit for applying scanning voltage signal to said plurality of scanning electrodes so as to sequentially select at least one scanning electrode in a prescribed cycle;
a data line drive circuit for applying data voltage signals to said plurality of data electrodes in synchronism with said scanning voltage signal;
means for applying image data to a first microshutter at a first intersection of a first particular scanning electrode and a particular data electrode to provide said first microshutter with a first optical state in a first scanning cycle and applying image data in accordance with gradation data of the image to a second microshutter, at a second intersection of a second particular scanning electrode and the particular data electrode, to provide said second microshutter with a second optical state in a subsequent second scanning cycle; and
means for moving said photosensitive member such that a particular position on said photosensitive member corresponds to said first particular scanning electrode in the first cycle and to said second particular scanning electrode in the subsequent second cycle.

10. An apparatus according to claim 9, wherein the first optical state is provided for a first duration in the first cycle and the second optical state is provided for a second duration in the second cycle, said first duration and second duration being different from each other.

11. An apparatus according to claim 10, wherein the first duration is twice as long as the second duration.

12. An apparatus according to claim 9, wherein said ferroelectric liquid crystal comprises a chiral smectic liquid crystal.

13. An apparatus according to claim 12, wherein said chiral smectic liquid crystal is disposed in a layer thin enough to release its own helical structure.

14. An image forming apparatus, comprising:
a light source;
an optical shutter unit comprising a pair of parallel substrates respectively having a plurality of scanning electrodes and a plurality of data electrodes disposed to intersect with each other to form a matrix electrode structure on opposite surfaces thereof and a ferroelectric liquid crystal disposed between said pair of substrates so as to form respective microshutters at each intersection of the scanning electrodes and data electrode;
an optical system for forming an image at a desired position with light transmitted through said optical shutter unit;
a photosensitive member;
a scanning line drive circuit for applying scanning voltage signals to said plurality of scanning electrodes so as to sequentially select at least one scanning electrode in a prescribed cycle;
a data line drive circuit for applying data voltage signals to said plurality of data electrodes in synchronism with said scanning voltage signal; and
means for moving said photosensitive member such that a first microshutter at the intersection of a first particular scanning electrode and a particular data electrode is supplied with image data so as to provide said first microshutter with a first optical state which corresponds to said first particular scanning electrode in a first scanning cycle, and such that in a subsequent second scanning cycle, said photosensitive member is moved to correspond to a second particular scanning electrode having thereon a second microshutter on said particular data electrode receiving image data in accordance with gradation data of the image so as to provide said second microshutter with a second optical state.

15. An apparatus according to claim 14, wherein the first optical state is provided for a first duration in the first cycle and the second optical state is provided for a second duration in the second cycle, the first duration and second duration being different from each other.

16. An apparatus according to claim 15, wherein the first duration is twice as long as the second duration.

* * * * *